(12) United States Patent
Huang et al.

(10) Patent No.: US 11,672,332 B2
(45) Date of Patent: Jun. 13, 2023

(54) STORAGE TABLE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 0 days.

(21) Appl. No.: 17/527,843

(22) Filed: Nov. 16, 2021

(65) Prior Publication Data
US 2023/0148746 A1    May 18, 2023

(51) Int. Cl.
*A47B 3/06* (2006.01)
*F16B 45/00* (2006.01)
*A47B 13/08* (2006.01)

(52) U.S. Cl.
CPC .............. *A47B 3/06* (2013.01); *A47B 13/083* (2013.01); *F16B 45/00* (2013.01)

(58) Field of Classification Search
CPC ......... A47B 3/06; A47B 13/083; A47B 13/16; A47B 13/02; A47B 2013/026
See application file for complete search history.

(56) References Cited

U.S. PATENT DOCUMENTS

| | | | | |
|---|---|---|---|---|
| 3,312,438 A * | 4/1967 | Goetz | ...................... | A47B 3/12 248/165 |
| 4,947,991 A * | 8/1990 | Snell | ...................... | A47B 13/16 206/427 |
| 6,049,928 A * | 4/2000 | Helmsderfer | .......... | A47D 5/003 5/655 |
| 6,092,704 A * | 7/2000 | Baumeister | ............... | B60R 7/02 224/311 |
| 6,669,067 B2 * | 12/2003 | Schuster | ................... | B60R 7/02 211/85.15 |
| 8,245,650 B1 * | 8/2012 | McKsymick | .......... | A47B 37/02 108/26 |
| 9,220,337 B1 * | 12/2015 | Wenzel | .................... | A47B 3/12 |
| 10,130,166 B1 * | 11/2018 | Prokopovich | .......... | B65D 33/14 |
| 11,311,103 B1 * | 4/2022 | Wilson | ..................... | A47B 9/00 |

(Continued)

FOREIGN PATENT DOCUMENTS

| | | | | |
|---|---|---|---|---|
| DE | 202015005161 U1 * | 10/2015 | ............. | A47B 13/02 |
| TW | 570256 U | 1/2004 | | |
| TW | M326366 U | 2/2008 | | |

OTHER PUBLICATIONS

English translation of DE 202015005161 (Year: 2020).*

(Continued)

*Primary Examiner* — Daniel J Rohrhoff
(74) *Attorney, Agent, or Firm* — Apex Juris, PLLC; Hilde Coeckx; Tracy Heims

(57) ABSTRACT

A storage table includes a platform and a supporting frame. The platform includes a board body, wherein an edge of the board body is disposed with a plurality of side plates. At least one of the side plates has a hook portion. The supporting frame is engaged with the a bottom portion of the platform to separate the platform from the ground. The hook portion on the side plate is provided for hanging an object.

14 Claims, 11 Drawing Sheets

(56) References Cited

U.S. PATENT DOCUMENTS

| | | | | |
|---|---|---|---|---|
| 2007/0039523 | A1* | 2/2007 | Helzer | A47B 13/083 |
| | | | | 108/27 |
| 2007/0056482 | A1* | 3/2007 | Robinson | A47B 37/04 |
| | | | | 108/25 |
| 2017/0042321 | A1* | 2/2017 | Clause | A47B 37/04 |
| 2018/0072208 | A1* | 3/2018 | Howe | A47B 37/04 |
| 2020/0390232 | A1* | 12/2020 | Shields | A47B 3/083 |
| 2021/0076653 | A1* | 3/2021 | Leigh | A47B 9/16 |
| 2021/0345627 | A1* | 11/2021 | Gonzalez | A22C 25/18 |

OTHER PUBLICATIONS

Search report for TW110136998, dated Jan. 10, 2022, Total of 1 page.
English abstract for TWM326366, Total of 1 page.
English abstract for TW570256, Total of 1 page.

* cited by examiner

STORAGE TABLE

BACKGROUND OF THE INVENTION

Technical Field

The present invention relates generally to a storage table, and more particularly to a storage table having a hanging portion.

Description of Related Art

A conventional portable storage table is easy for storage, so it is usually used in outdoor activities, such as barbecue, picnic, camp, and so on. Cooking devices for cooking food are usually put on a tabletop of the storage table. For sake of safety, a gas tank connected to the cooking device should keep away from the cooking device, such as a stove, an oven, and so on, so that the gas tank is usually put on the ground. At the time, the gas tube for connecting the gas tank and the cook device extends away from the storage table and/or falls on the ground, so that a user is easy to be tripped by the gas tube and fall when the user walks around. Furthermore, in case the cooking device is pulled and fall down from the storage table, an injury or harm can occur to the user.

Besides, during the outdoor activities, a bottle or a portable Bluetooth speaker is usually put on the table rather than on the ground to avoid being dirtied or damaged. However, tabletops of most of the portable storage tables are designed to have smaller area for purpose of convenience. After the large cooking device is put on the tabletop, the tabletop has no space for other objects, such as the bottle and the Bluetooth speaker. Even though the tabletop still remains some tiny space for putting the bottle and the speaker, the objects are unstable and possibly fall from the tabletop at any time. Therefore, the conventional portable storage table has room for improvement.

BRIEF SUMMARY OF THE INVENTION

In view of the above, the primary objective of the present invention is to provide a storage table that could hang an object.

The present invention provides a storage table includes a platform and a supporting frame. The platform includes a board body and at least one side plate, wherein the at least one side plate is disposed along an edge of the board body, and the at least one side plate has a hook portion. The supporting frame is engaged with the platform and is adapted to separate the platform away from a ground.

With such design, the hook portion disposed on the side plate of the platform is provided for hanging the object, so that the object could be stored properly and organizationally, thereby avoid the trouble and the safety risk due to putting the object on the ground.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
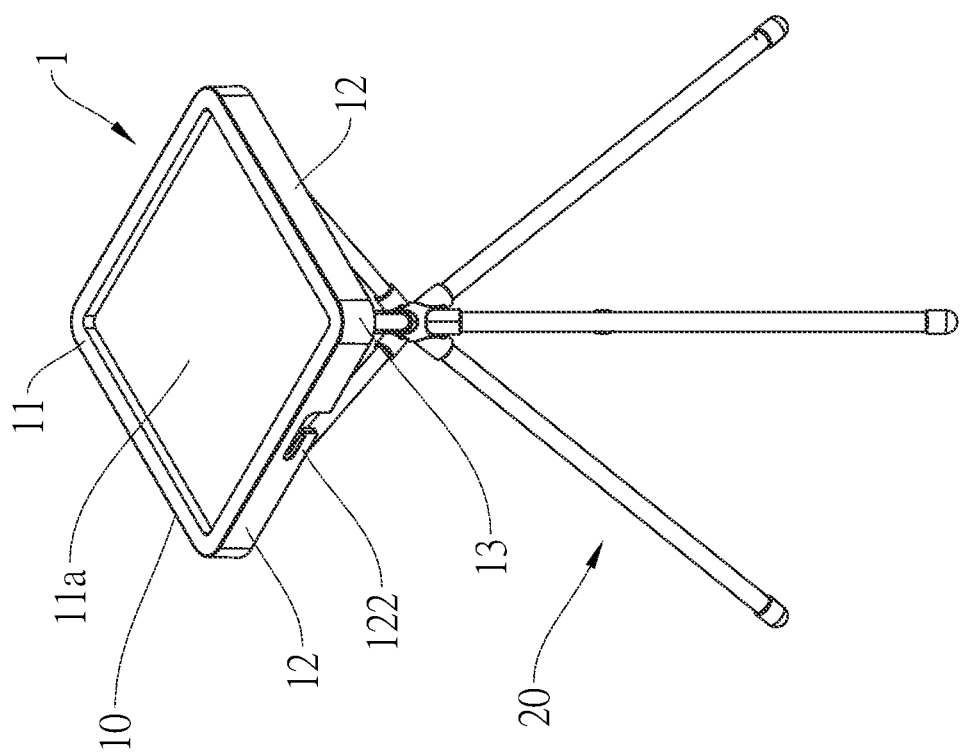
FIG. 1 is a perspective view of the storage table of an first embodiment according to the present invention.
Figure 2:
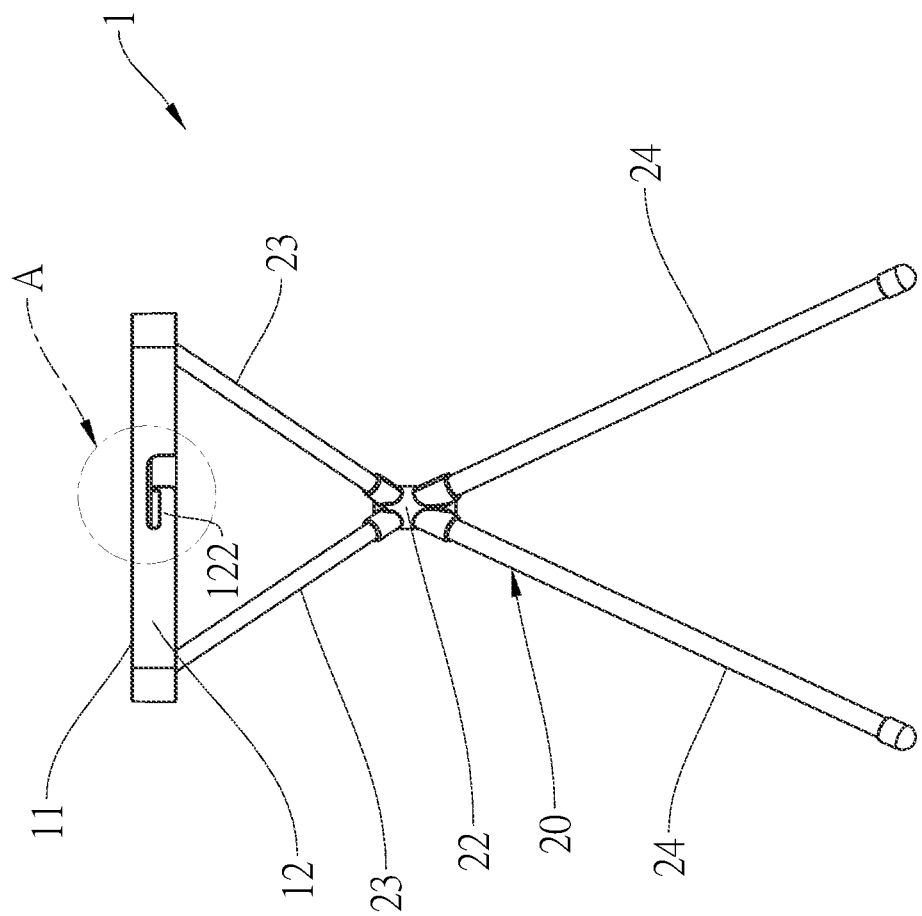
FIG. 2 is a side view of the storage table of the first embodiment according to the present invention.

As illustrated in FIG. 1 to FIG. 9, a storage table 1 of a first embodiment according to the present invention includes a platform 10 and a supporting frame 20.

The platform 10 includes a board body 11 and at least one side plate 12. In the current embodiment, the platform 10 is rectangular. The board body 11 is a rectangular board body, having a receiving groove 11a formed by recessing into a top surface of the board body 11, wherein the receiving groove 11a is provided for carrying an object, such as a stove. In the current embodiment, the at least one side plate 12 includes a plurality of side plates 12. Each of the side plates 12 is disposed along an edge of the board body 11. Adjacent two of the side plates 12 are connected to form a corner 13.

At least one of the side plates 12 of the platform 10 has a hook portion 122, wherein the hook portion 122 is integrally formed with the at least one of the side plates 12 as a monolithic unit. The hook portion 122 is adapted to hang a bottle, a gas tank, a mobile speaker, and so on. In an embodiment, the number of the hook portion 122 is not limited to one. There could be two or more hook portions 122 disposed on one side plate 12.

Figure 3:
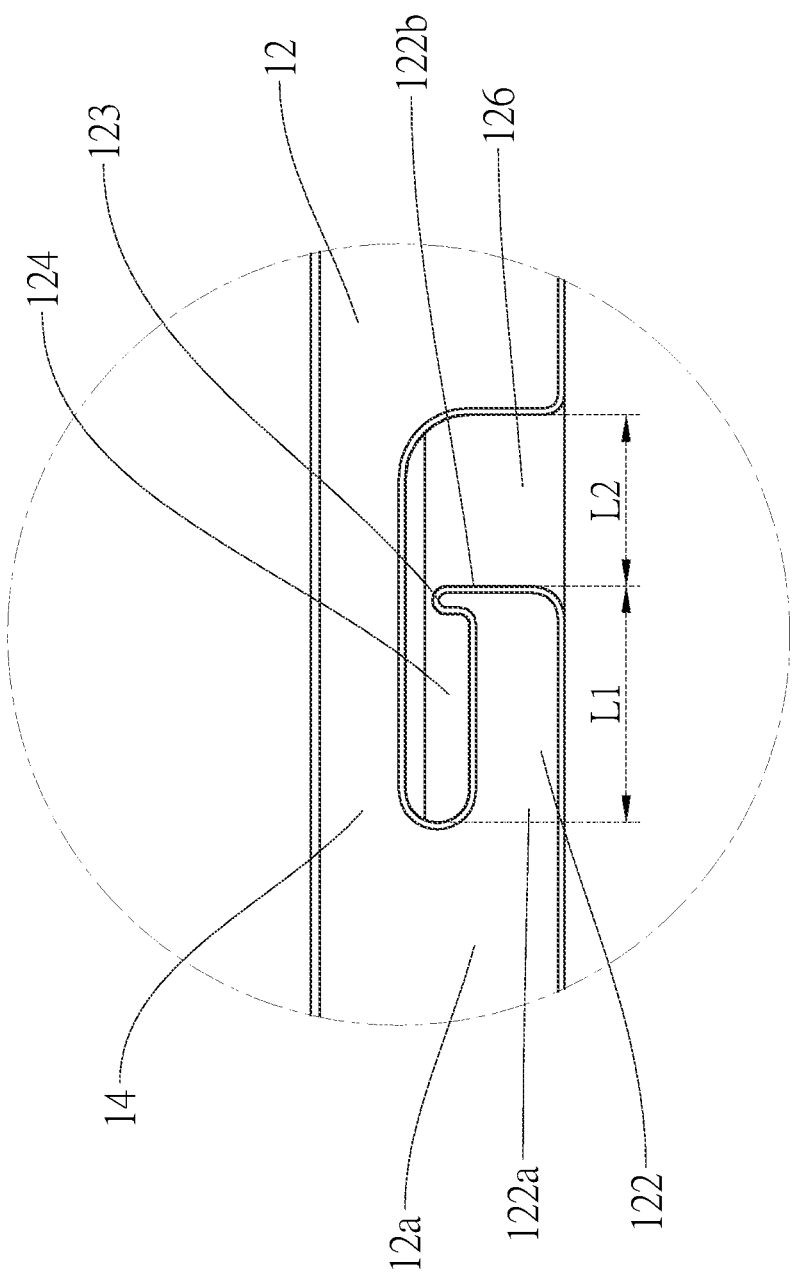
FIG. 3 is an enlarged partial view of a marked region A in FIG. 2.

As illustrated in FIG. 3, the side plate 12 has a groove 124 and a notch 126, wherein the notch 126 is formed on an edge of the side plate 12 and communicates with the groove 124. The notch 126 is formed by recessing into a bottom edge of the side plate 12. The hook portion 122 is formed at a side of the groove 124.

The hook portion 122 has a fixed end 122a and a free end 122b. A first length L1 is defined as a distance between the fixed end 122a and the free end 122b. A second length L2 is defined as a width of an opening of the notch 126. The first length L1 is greater than or equal to the second length L2. The free end 122b of the hook portion 122 has a protrusion 123 that extends upward, namely toward the groove 124.

Figure 4:
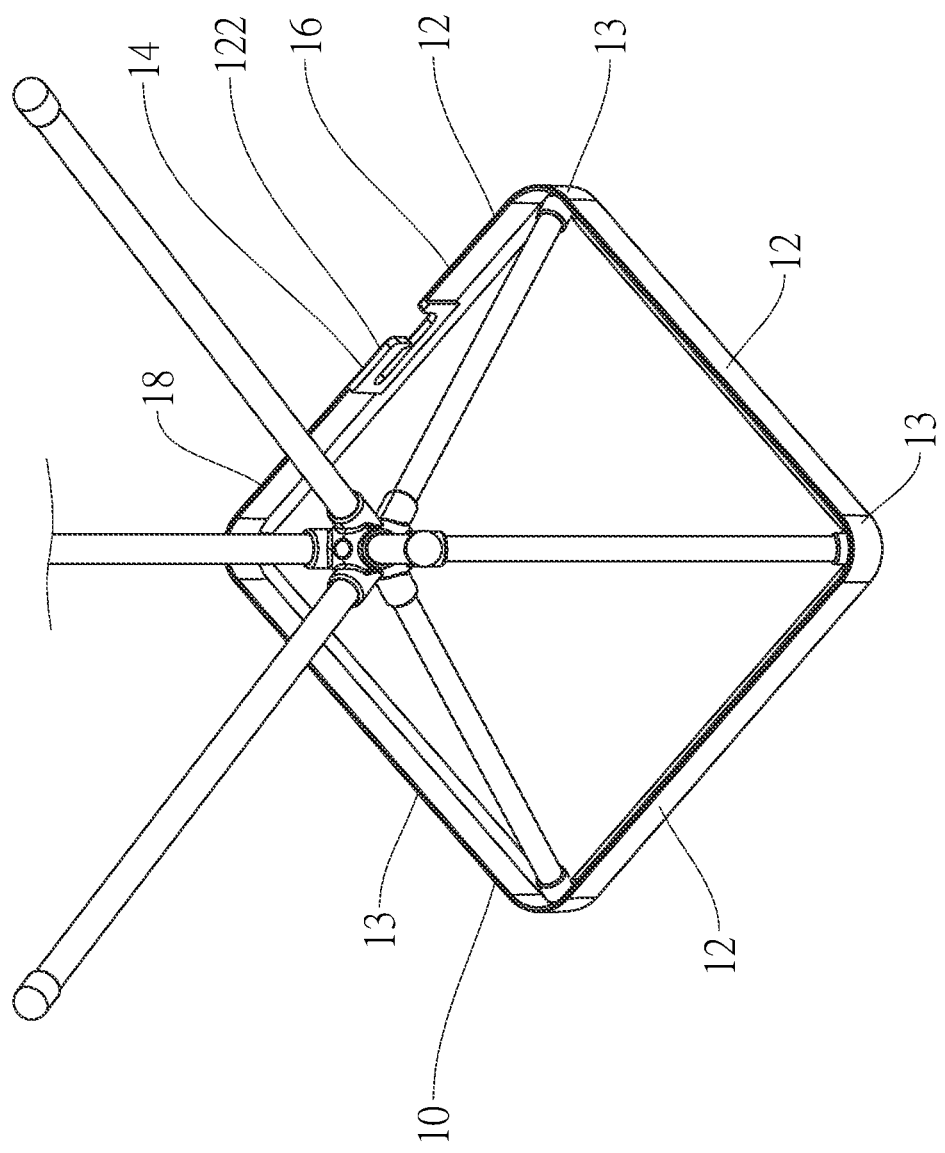
FIG. 4 is a perspective view of the storage table of the first embodiment according to the present invention seen from another perspective.
Figure 5:
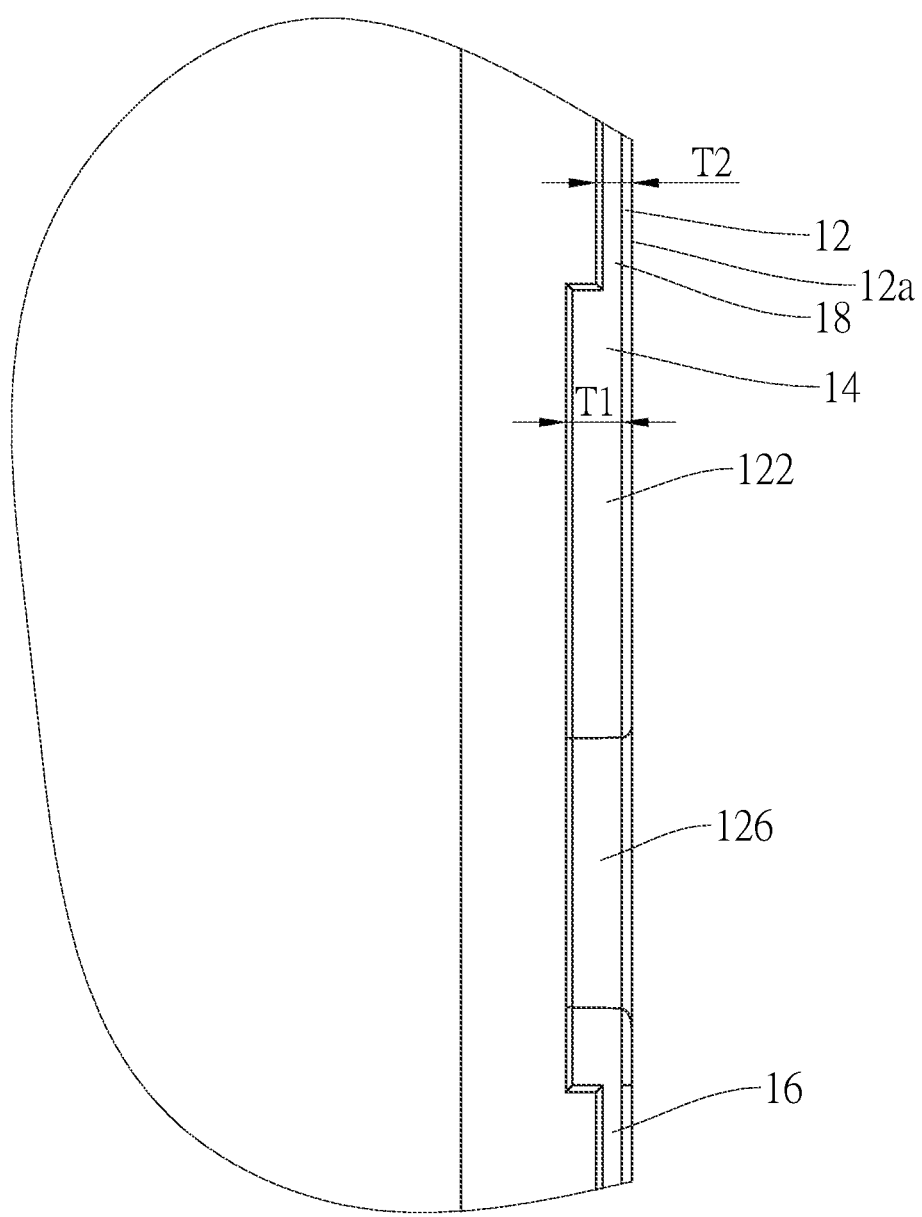
FIG. 5 is an enlarged partial bottom view of the side plate of the first embodiment according to the present invention.

As illustrated in FIG. 4 and FIG. 5, the side plate 12 includes a first section 14 and a second section 16 which are connected to each other. The first section 14 has the hook portion 122. On an external surface 12a of the side plate 12, the first section 14 and the second section 16 are aligned with each other. The first section 14 extends in a direction back to the external surface and has a first thickness T1 that is greater than a second thickness T2 of the second section 16. Preferably, the first thickness T1 of the first section 14 is at least two times greater than the second thickness T2 of the second section 16, thereby enhancing the structural strength of the hook portion 122. In the current embodiment, the side plate 12 further includes a third section 18 that is connected to another side of the first section 14, wherein a thickness of the third section 18 is as same as the second thickness T2 of the second section 16. In other words, the third section 18 and the second section 16 of the side plate 12 are respectively connected to the two opposite sides of the first section 14.

Figure 6:
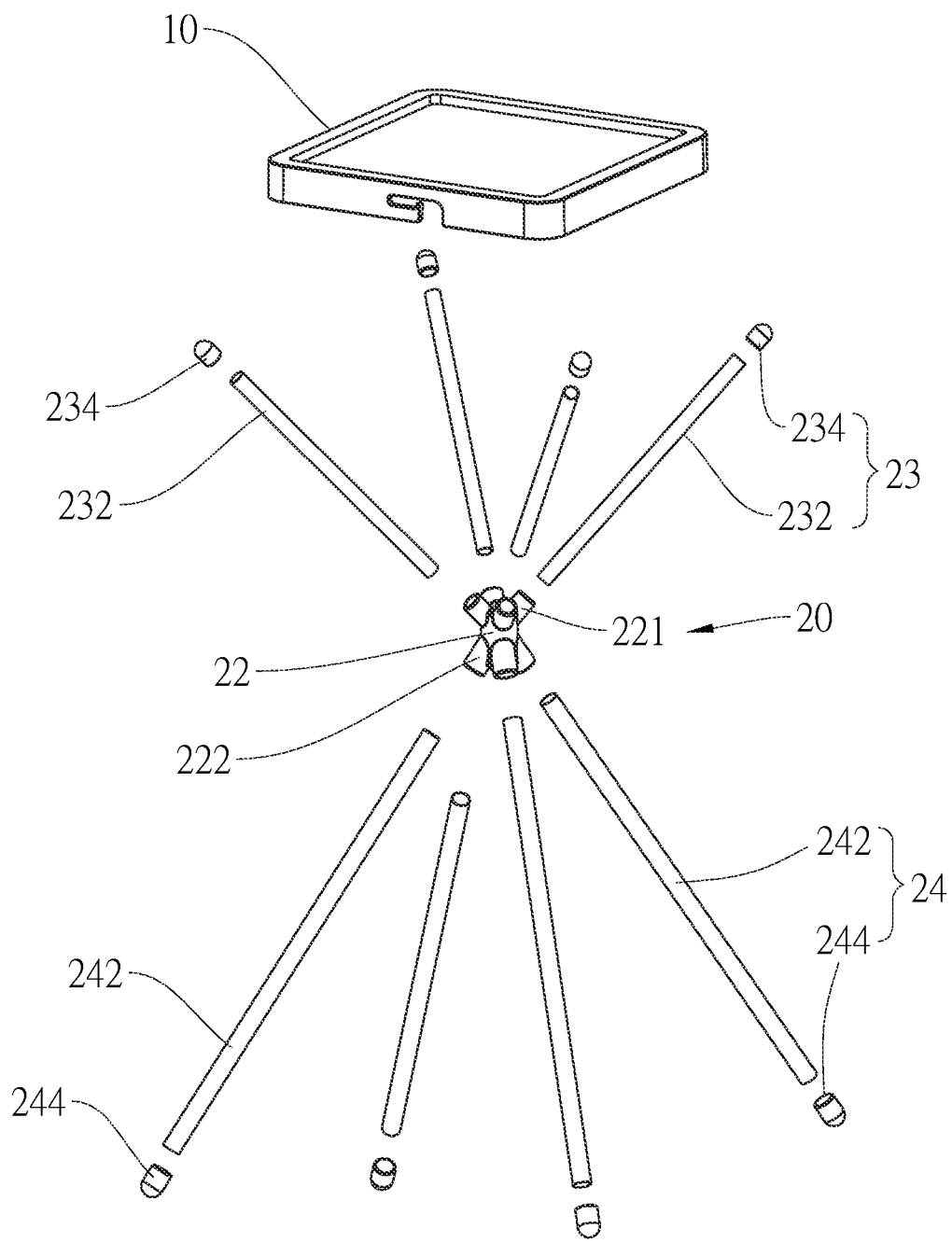
FIG. 6 is an exploded view of the storage table of the first embodiment according to the present invention.

As illustrated in FIG. 6, the supporting frame 20 is detachably engaged with the platform 10 to support the platform 10, so that the platform 10 stands away from a ground. The supporting frame 20 includes the connecting seat 22, a plurality of upper supporting rods 23, and a plurality of lower supporting rods 24.

Figure 7:
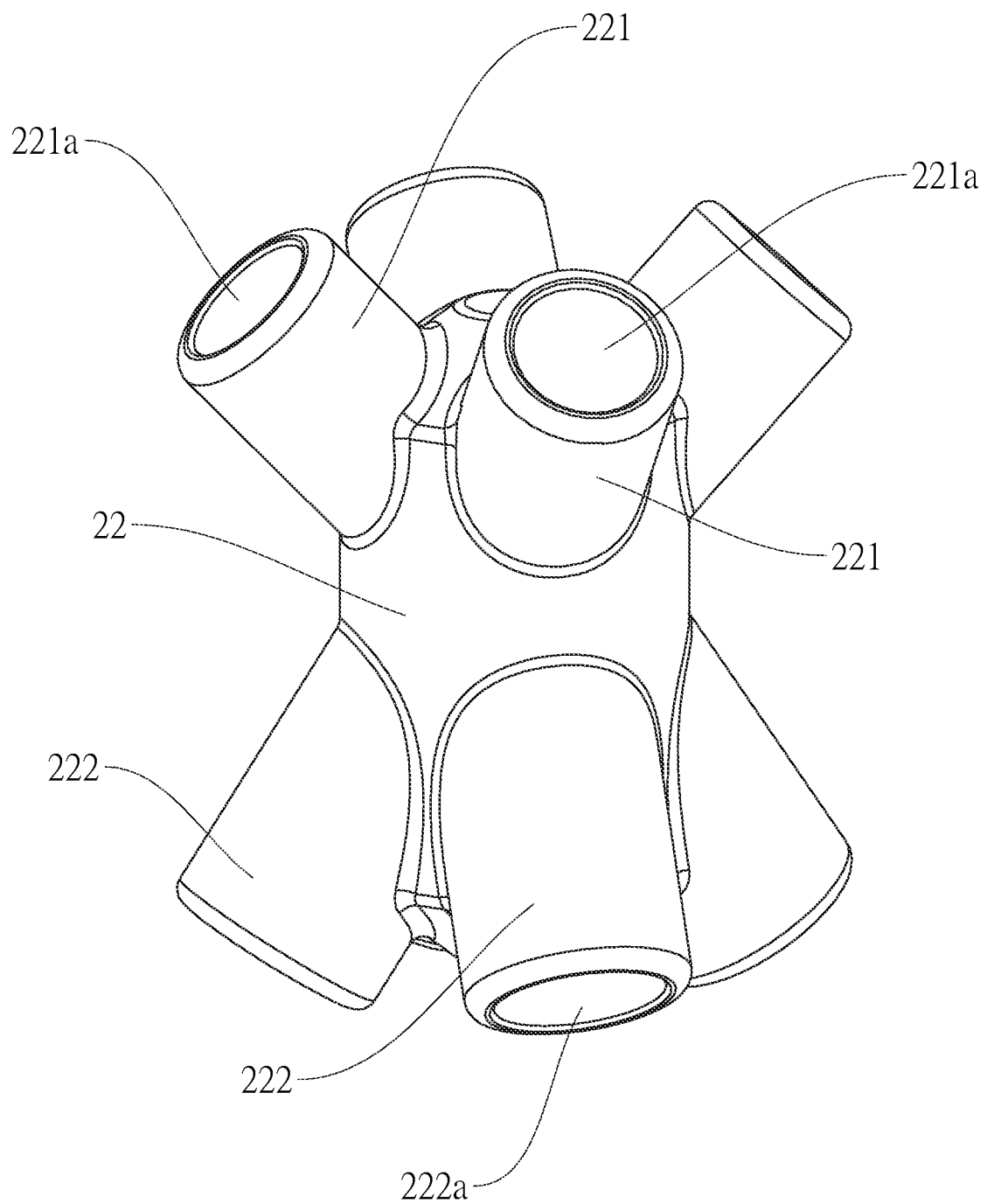
FIG. 7 is a perspective view of the connecting seat of the first embodiment according to the present invention.

As illustrated in FIG. 7, the connecting seat 22 has a plurality of upward extending tubes 221 and a plurality of downward extending tubes 222, wherein each of the upward extending tubes 221 has a hole 221a, and each of the downward extending tubes 222 has a hole 222a. It is worthy to mention that the downward extending tubes 222 protrude from a bottom portion of the connecting seat 22 and extend toward the ground; the upward extending tubes 221 protrude from a top portion of the connecting seat 22 and extend away from the ground. Each of the upper supporting rods 23 could be inserted into one of the holes 221a of the upward extending tubes 221 and extend upward. Each of the lower supporting rods 24 could be inserted into one of the holes 222a of the downward extending tubes 222 and extend downward. The upper supporting rods 23 and the lower supporting rods 24 could also be detached from the holes 221a, 222a. With such design, the upper supporting rods 23 and the lower supporting rods 24 could be engaged with or be disengaged from the connecting seat 22.

Figure 8:
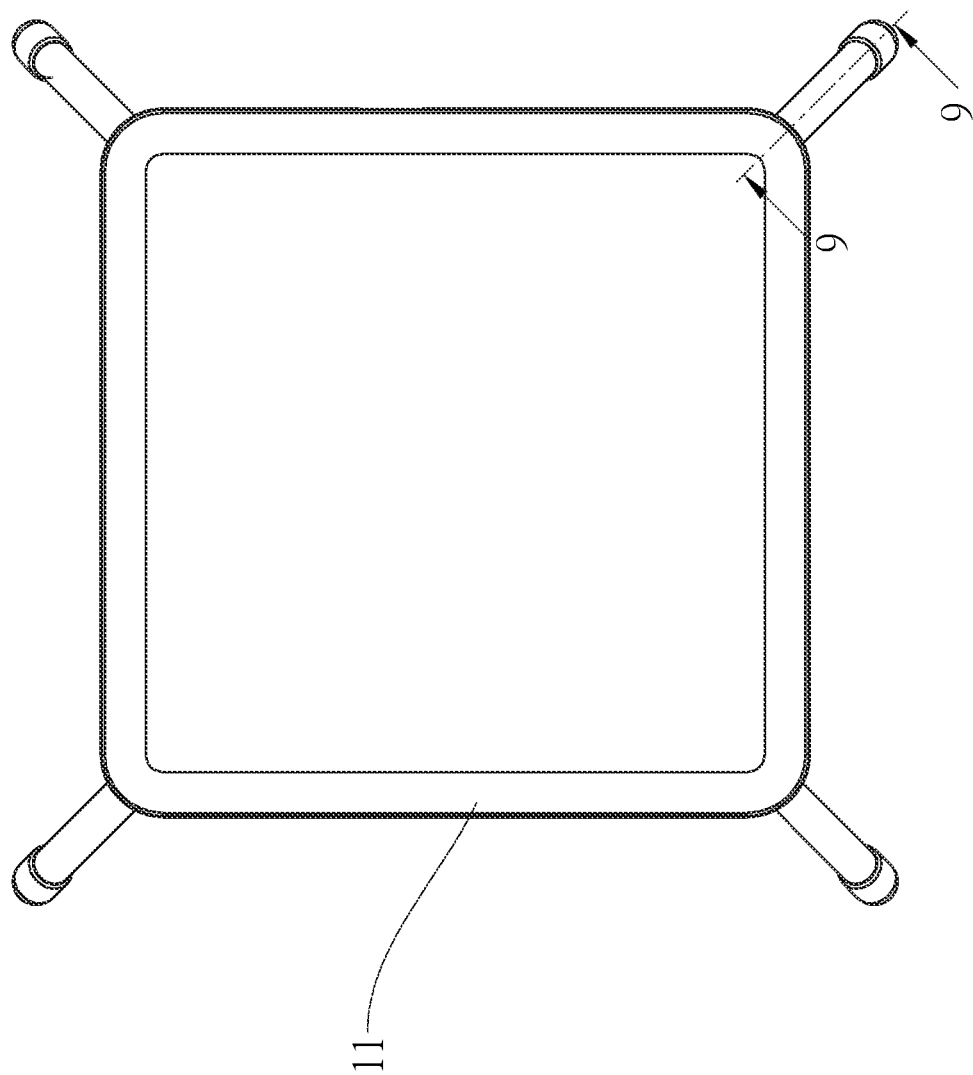
FIG. 8 is a top view of the storage table of the first embodiment according to the present invention.
Figure 9:
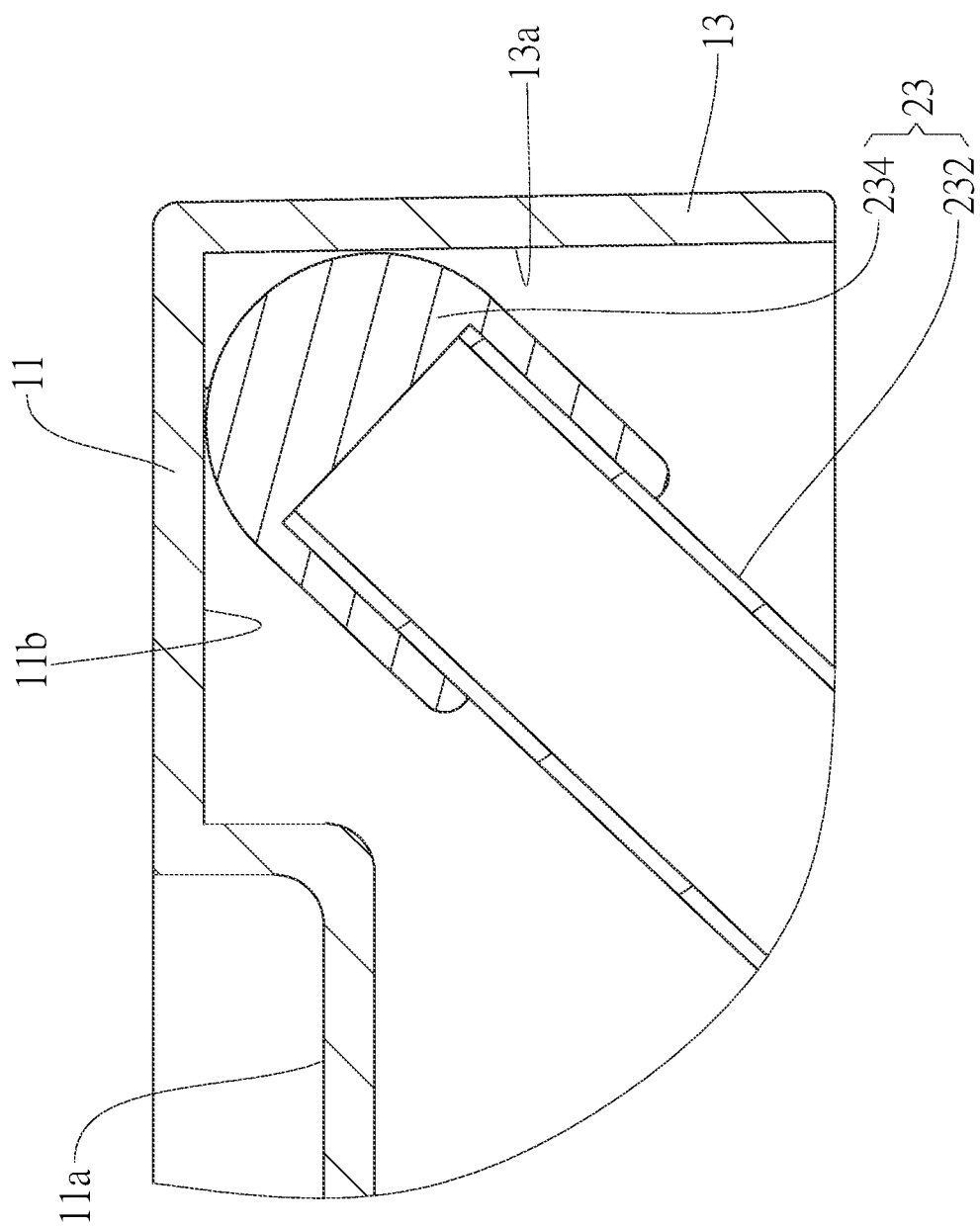
FIG. 9 is a sectional view taken along the 9-9 line in FIG. 8.

In the current embodiment, each of the upper supporting rods 23 includes a rod body 232 and a non-slip cover 234. An end of each of the rod bodies 232 is inserted into one of the holes 221a of the upward extending tubes 221. Each of the non-slip covers 234 fits around another end of one of the rod body 232. The rod bodies 232 could be made of a metal material or a plastic material. The non-slip covers 234 could be made of a rubber material. As illustrated in FIG. 8 and FIG. 9, each of the non-slip covers 234 of the upper supporting rods 23 abuts against an internal surface 13 of one of the corner 13 and a bottom surface 11b of the board body 11.

Each of the lower supporting rods 24 includes a rod body 242 and a non-slip cover 244. An end of each of the rod bodies 242 is inserted into one of the holes 222a of the downward extending tubes 222. Each of the non-slip covers 244 fits around another end of one of the rod bodies 242. The rod bodies 242 could be made of a metal material or a plastic material. The non-slip covers 244 could be made of a rubber material. The non-slip covers 244 touch the ground, thereby preventing sliding.

Figure 10:
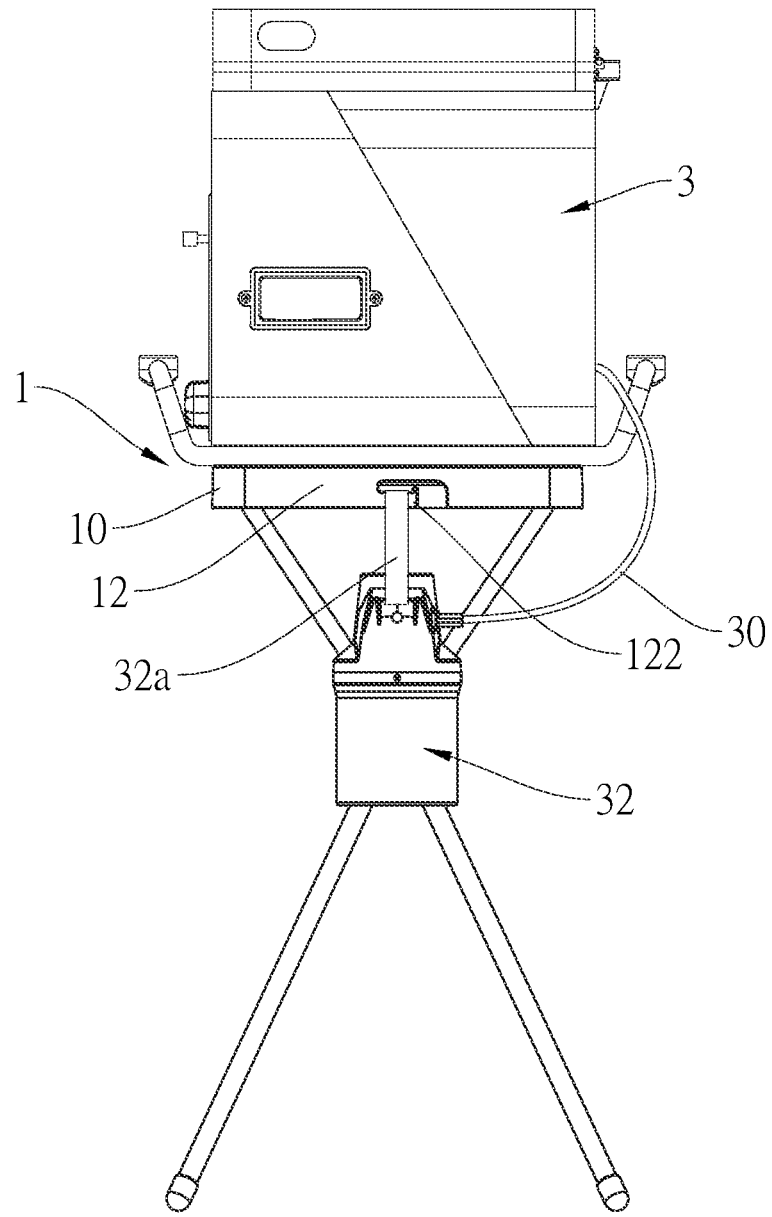
FIG. 10 is a schematic view of the storage table of the first embodiment according to the present invention, showing the anti-slip cover abuts against the internal surface of the corner.

As illustrated in FIG. 10, a cooking device, such as an oven 3, could be put on the storage table 1. The oven 3 is connected to a gas tank 32 via a gas tube 30. The gas tank 32 is disposed with a ring 32a for hanging on the hook portion 122 of the storage table 1, so that the gas tank 32 could be hung on a lateral side of the board body 10. With such design, the gas tank 32 could be located away from the oven 3 on the platform 10. Additionally, since the gas tank 32 is hung on the storage table 1 and is suspended in the air, the safety problem caused by the gas tank 32 being put on the ground could be prevented; for example, a user is not going to be tripped by the gas tank 32 on the ground and fell.

Figure 11:
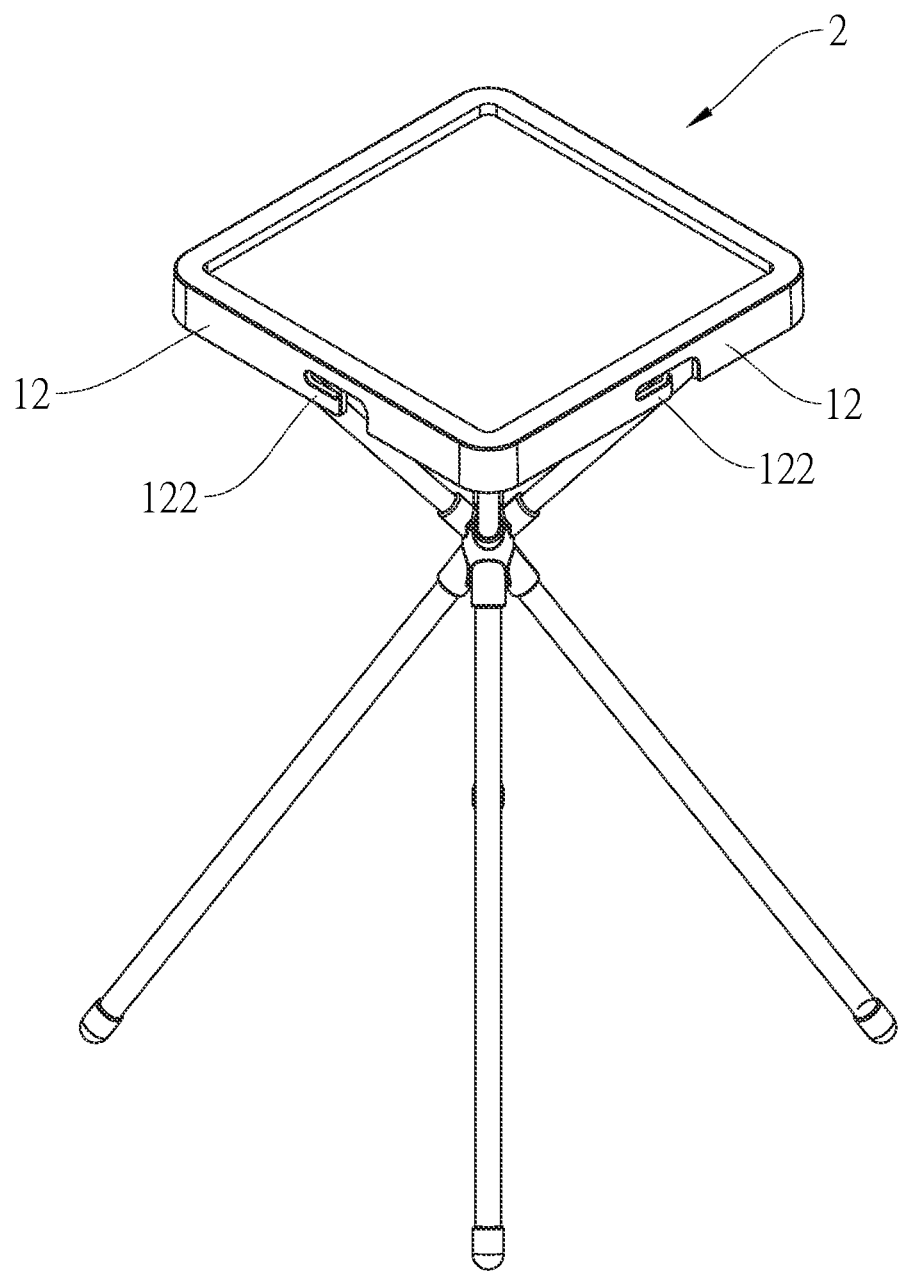
FIG. 11 is a perspective view of the storage table of a second embodiment according to the present invention.

As illustrated in FIG. 11, a storage table 2 of a second embodiment according to the present invention has almost the same structure as that of the first embodiment, except that more than one of the side plates 12 have one hook portion 122. In the current embodiment, each of adjacent two of the side plates 12 has at least one hook portion 122. In another embodiment, each of opposite two of the side plates 12 has at least one hook portion 122. In an embodiment, three or four of the side plates 12 could have at least one hook portion 122 on each of the three or four side plates 12.

It must be pointed out that the embodiment described above is only a preferred embodiment of the present invention. All equivalent structures which employ the concepts disclosed in this specification and the appended claims should fall within the scope of the present invention.

What is claimed is:

1. A storage table, comprising:
   a platform comprising a board body and at least one side plate, wherein the at least one side plate is disposed along an edge of the board body, and the at least one side plate has a hook portion;
   a supporting frame engaged with the platform and adapted to support the platform away from a ground;
   wherein the hook portion is integrally formed with the at least one side plate as a monolithic unit; and
   wherein the at least one side plate has a groove and a notch; the notch is formed on an edge of the at least one side plate and communicates with the groove; the hook portion is formed at a side of the groove.

2. The storage table of claim 1, wherein the at least one side plate comprises a first section and a second section that are connected to each other, and a thickness of the first section is greater than a thickness of the second section; the first section has the hook portion.

3. The storage table of claim 1, wherein the notch is located at a bottom edge of the at least one side plate.

4. The storage table of claim 1, wherein the hook portion has a fixed end and a free end; a first length is defined as a distance between the fixed end and the free end; a second length is defined as a width of an opening of the notch; the first length is greater than or equal to the second length.

5. The storage table of claim 3, wherein the hook portion has a fixed end and a free end; the free end of the hook portion has a protrusion that extends upward.

6. The storage table of claim 1, wherein the at least one side plate comprises a plurality of side plates, and each of the plurality of side plates has one hook portion.

7. The storage table of claim 1, wherein the at least one side plate comprises a plurality of side plates, and at least one of the plurality of side plates has the hook portion; corners are formed between each adjacent two of the side plates; the supporting frame comprises a plurality of upper supporting rods, wherein each of the plurality of upper supporting rods abuts against an internal surface of one of the corners.

8. The storage table of claim 7, wherein each of the plurality of upper supporting rods comprises a rod body and a non-slip cover; each of the non-slip covers fits around an end of one of the rod bodies and abuts against the internal surface of one of the corners.

9. The storage table of claim 7, wherein each of the plurality of upper supporting rods abuts against a bottom surface of the board body and the internal surface of one of the corners.

10. The storage table of claim 7, wherein the supporting frame comprises a connecting seat and a plurality of lower supporting rods; the plurality of upper supporting rods is detachably connected to the connecting seat and extends upward; the plurality of lower supporting rods is detachably connected to the connecting seat and extends downward.

11. The storage table of claim 10, wherein the connecting seat has a plurality of holes; the plurality of upper supporting rods and the plurality of lower supporting rods are respectively inserted into the holes.

12. The storage table of claim 11, wherein the connecting seat comprises a plurality of upward extending tubes and a plurality of downward extending tubes, wherein the plurality of upward extending tubes and the plurality of downward extending tubes respectively have the holes.

13. The storage table of claim 1, wherein the board body has a receiving groove on a top surface.

14. A storage table, comprising:
- a platform comprising a board body and at least one side plate, wherein the at least one side plate is disposed along an edge of the board body, and the at least one side plate has a hook portion;
- a supporting frame engaged with the platform and adapted to support the platform away from a ground;
- wherein the at least one side plate comprises a plurality of side plates, and at least one of the plurality of side plates has the hook portion; corners are formed between each adjacent two of the side plates; the supporting frame comprises a plurality of upper supporting rods, wherein each of the plurality of upper supporting rods abuts against an internal surface of one of the corners;
- wherein the supporting frame comprises a connecting seat and a plurality of lower supporting rods; the plurality of upper supporting rods is detachably connected to the connecting seat and extends upward; the plurality of lower supporting rods is detachably connected to the connecting seat and extends downward;
- wherein the connecting seat has a plurality of holes; the plurality of upper supporting rods and the plurality of lower supporting rods are respectively inserted into the holes; and
- wherein the connecting seat comprises a plurality of upward extending tubes and a plurality of downward extending tubes, wherein the plurality of upward extending tubes and the plurality of downward extending tubes respectively have the holes.

* * * * *